(12) United States Patent
Misra et al.

(10) Patent No.: US 11,778,054 B2
(45) Date of Patent: Oct. 3, 2023

(54) MIGRATION CONTEXT AND FLOW GRAPH BASED MIGRATION CONTROL

(71) Applicant: ACCENTURE GLOBAL SOLUTIONS LIMITED, Dublin (IE)

(72) Inventors: Janardan Misra, Bangalore (IN); Sanjay Mittal, Bangalore (IN); Vikrant Kaulgud, Pune (IN); Ravi Kiran Velama, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/495,553

(22) Filed: Oct. 6, 2021

(65) Prior Publication Data
US 2023/0109513 A1    Apr. 6, 2023

(51) Int. Cl.
*H04L 67/00* (2022.01)
*G06F 11/07* (2006.01)
*G06F 11/30* (2006.01)
*G06F 11/34* (2006.01)

(52) U.S. Cl.
CPC .......... *H04L 67/34* (2013.01); *G06F 11/0712* (2013.01); *G06F 11/3086* (2013.01); *G06F 11/3476* (2013.01)

(58) Field of Classification Search
CPC .. H04L 67/34; G06F 11/0712; G06F 11/3086; G06F 11/347; G06F 11/3476; G06F 9/4856; G06F 9/541; G06F 9/4868
See application file for complete search history.

(56) References Cited

U.S. PATENT DOCUMENTS

| | | | |
|---|---|---|---|
| 9,612,767 B2 | 4/2017 | Huang et al. | |
| 2004/0015950 A1* | 1/2004 | Dutta | H04L 69/329 717/176 |
| 2007/0050757 A1* | 3/2007 | van Woerkom | G06F 9/454 717/117 |
| 2008/0115123 A1* | 5/2008 | Kelly | G06F 8/65 717/177 |
| 2013/0205007 A1* | 8/2013 | Ayachitula | G06F 9/5072 709/224 |

FOREIGN PATENT DOCUMENTS

EP    3495951 A1    6/2019

* cited by examiner

*Primary Examiner* — Anh Nguyen
(74) *Attorney, Agent, or Firm* — Mannava & Kang, P.C.

(57) ABSTRACT

In some examples, migration context and flow graph based migration control may include ascertaining an application that is to be migrated from a physical environment to a cloud environment, and determining a migration issue associated with the migration of the application. Migration context and flow graph based migration control may further include identifying, from a historical issue database, a plurality of historical issues, determining, for the migration issue and the plurality of historical issues, unified proximities, sorting, based on the determined unified proximities, the historical issues, selecting, from the sorted historical issues, a topmost historical issue, and determining, from the topmost historical issue, a resolution associated with the topmost historical issue. Further, migration context and flow graph based migration control may include executing the resolution to resolve the migration issue, and performing, based on the resolved migration issue, migration of the application from the physical environment to the cloud environment.

19 Claims, 19 Drawing Sheets

| Issue ID | Item | Resolution | Environment | Impact |
|---|---|---|---|---|
| 1 | Intermittent connectivity issues. | Restart application to pickup new resource adapter name. | UAT | Low |
| 2 | RFC connection not working. | Enable remote user access as per new server ports. | Prod | Medium |
| 3 | Database connection failing. | Repoint database connection to new DB engine when there is a plan to upgrade as well. | Prod | Medium |
| 4 | Missing foreign keys. | Use the database's native tools for creating the missing objects. | UAT | High |
| 5 | Missing secondary indexes. | Use a schema conversion tool for migrating the objects. | UAT | High |

FIG. 5

| Issue ID | Item | Resolution | Environment | Impact |
|---|---|---|---|---|
| X | Database intermittent connection errors. | Matches issue 3 | Prod | Medium |
| Y | Missing foreign keys and secondary indexes. | Matches issue 5 | UAT | High |

FIG. 6

Example Historical Resolution 1

- Issue Details
  - Description: Intermittent connectivity issues.
  - Impact Level: Low
  - Environment : UAT

- Project Context:
  - Business Domain (bd): Healthcare
  - Technical Domain (td): Custom

- Migration Context:
  - Migration strategy type (m) : Re-hosting
  - Source OS (so) : Windows
  - Target OS (to) : Windows
  - Source DB (sd): SAP HANA
  - Target DB (td) : SAP HANA
  - With upgrade(wu): 0

- Architectural Context:
  - Number of Servers (ns): 20
  - Volume of Data -- TB (vd): 10
  - Number of Applications (na): 40
  - Source Hardware (sh): Solaris
  - CI/CD Pipeline (cc): 1
  - Cloud Provider (cp): Azure
  - Type of Cloud (tc): Private

- Sub-Process/Activity
  - Name (an): Network Validation

- Migration Flow
  Requirement Discussion -> Design -> Bill of Material -> VM Build Sheet - > VM Provisioning -> VM Validation -> Perform Network Validation

*FIG. 7*

Example Historical Resolution 2

- Issue Details
  - Description: RFC connection not working.
  - Impact Level: Medium
  - Environment: Prod

- Project Context:
  - Business Domain (bd): Financial
  - Technical Domain (td): Legacy

- Migration Context:
  - Migration strategy type (m): Re-platforming
  - Source OS (so): Z-OS
  - Target OS (to): Windows
  - Source DB (sd): IBM DB2
  - Target DB (td): SAP HANA
  - With upgrade(wu): 0

- Architectural Context:
  - Number of Servers (ns): 15
  - Volume of Data – TB (vd): 7
  - Number of Applications (na): 25
  - Source Hardware (sh): IBM Z
  - CI/CD Pipeline (cc): 0
  - Cloud Provider (cp): AWS
  - Type of Cloud (tc): Private

- Sub-Process/Activity
  - Name (an): Data Validation

- Migration Flow
  Requirement Discussion -> Design -> Bill of Material -> VM Build Sheet -> VM Provisioning -> VM Validation -> Migration Planning -> Pre Migration -> Pre-Migration data assessment

*FIG. 7 (CONT.)*

Example Historical Resolution 3

- Issue Details
  - Description: Database connection failing.
  - Impact Level: Medium
  - Environment : Prod
- Project Context:
  - Business Domain (bd): Media
  - Technical Domain (td): Web Application
- Migration Context:
  - Migration strategy type (m) : Re-platforming
  - Source OS (so) : Linux
  - Target OS (to) : Windows
  - Source DB (sd) : Oracle
  - Target DB (td) : SAP HANA
  - With upgrade(wu): 1
- Architectural Context:
  - Number of Servers (ns): 40
  - Volume of Data – TB (vd): 30
  - Number of Applications (na): 30
  - Source Hardware (sh): Sun Spark
  - CI/CD Pipeline (cc): 1
  - Cloud Provider (cp): Azure
  - Type of Cloud (tc): Public
- Sub-Process/Activity
  - Name (an): Integration Testing
- Migration Flow
  - Requirement Discussion -> Design -> Bill of Material -> VM Build Sheet - > VM Provisioning -> VM Validation -> Migration Planning -> Pre Migration -> Migration -> Post Migration -> Integration Testing

*FIG. 7 (CONT.)*

Example Historical Resolution 4

- Issue Details
  - Description: Missing foreign keys.
  - Impact Level: High
  - Environment : UAT
- Project Context:
  - Business Domain (bd): Resources
  - Technical Domain (td): COTS
- Migration Context:
  - Migration strategy type (m) : Re-hosting
  - Source OS (so) : Linux
  - Target OS (to) : Linux
  - Source DB (sd) : SQL
  - Target DB (td) : SQL
  - With upgrade(wu): 0
- Architectural Context:
  - Number of Servers (ns): 30
  - Volume of Data – TB (vd): 25
  - Number of Applications (na): 22
  - Source Hardware (sh): Dell PowerEdge
  - CI/CD Pipeline (cc): 0
  - Cloud Provider (cp): GCP
  - Type of Cloud (tc): Public
- Sub-Process/Activity
  - Name (an): Database Validation
- Migration Flow
  - Requirement Discussion -> Design -> Bill of Material -> VM Build Sheet -> VM Provisioning -> VM Validation -> Migration Planning -> Pre Migration -> Migration -> Post Migration -> Database Validation

*FIG. 7 (CONT.)*

Example Historical Resolution 5

- Issue Details
  - Description: Missing secondary indexes.
  - Impact Level: High
  - Environment: UAT

- Project Context:
  - Business Domain (bd): Financial
  - Technical Domain (td): COTS

- Migration Context:
  - Migration strategy type (m): Re-factoring
  - Source OS (so): Linux
  - Target OS (to): Windows
  - Source DB (sd): Oracle
  - Target DB (td): SAP HANA
  - With upgrade(wu): 1

- Architectural Context:
  - Number of Servers (ns): 25
  - Volume of Data – TB (vd): 20
  - Number of Applications (na): 34
  - Source Hardware (sh): HP Proliant
  - CI/CD Pipeline (cc): 1
  - Cloud Provider (cp): Azure
  - Type of Cloud (tc): Hybrid

- Sub-Process/Activity
  - Name (an): Database Validation

- Migration Flow
  - Requirement Discussion -> Design -> Bill of Material -> VM Build Sheet -> VM Provisioning -> VM Validation -> Migration Planning -> Pre Migration -> Migration -> Post Migration -> Database Validation

*FIG. 7 (CONT.)*

Example New Issue X

- Issue Details
  - Description: Database intermittent connection errors.
  - Impact Level: Medium
  - Environment: Prod
- Project Context:
  - Business Domain (bd): Media
  - Technical Domain (td): Web Application
- Migration Context:
  - Migration strategy type (m): Re-factoring
  - Source OS (so): Windows
  - Target OS (to): Windows
  - Source DB (sd): SQL
  - Target DB (td): SAP HANA
  - With upgrade(wu): 1
- Architectural Context:
  - Number of Servers (ns): 35
  - Volume of Data – TB (vd): 2B
  - Number of Applications (na): 29
  - Source Hardware (sh): Sun Sparc
  - CI/CD Pipeline (cc): 0
  - Cloud Provider (cp): Azure
  - Type of Cloud (tc): Hybrid
- Sub-Process/Activity
  - Name (an): Functional Testing
- Migration Flow
  - Requirement Discussion -> Design -> Bill of Material -> VM Build Sheet -> VM Provisioning -> VM Validation -> Migration Planning -> Pre Migration -> Migration -> Post Migration -> Functional Testing

*FIG. 8*

Example New Issue Y

- Issue Details
  - Description: Missing foreign keys and secondary indexes.
  - Impact Level: High
  - Environment : UAT

- Project Context:
  - Business Domain (bd): Financial
  - Technical Domain (td): COTS

- Migration Context:
  - Migration strategy type (m) : Re-factoring
  - Source OS (so) : Linux
  - Target OS (to) : Windows
  - Source DB (sd) : Oracle
  - Target DB (td) : SAP HANA
  - With upgrade(wu): 1

- Architectural Context:
  - Number of Servers (ns): 20
  - Volume of Data -- TB (vd): 15
  - Number of Applications (na): 32
  - Source Hardware (sh): HP Proliant
  - CI/CD Pipeline (cc): 0
  - Cloud Provider (cp): AWS
  - Type of Cloud (tc): Private

- Sub-Process/Activity
  - Name (an): Database Validation

- Migration Flow
  - Requirement Discussion -> Design -> Bill of Material -> VM Build Sheet - > VM Provisioning -> VM Validation -> Migration Planning -> Pre Migration -> Migration -> Post Migration-> Database Validation

| | Unified Proximity | |
|---|---|---|
| | X | Y |
| 1 | 3.48 | 1.54 |
| 2 | 2.67 | 2.1 |
| 3 | 6.8 | 2.88 |
| 4 | 2.24 | 4.04 |
| 5 | 3.32 | 7 |

```
┌─────────────────────────────────────────────────────────┐
│ ASCERTAIN AN APPLICATION THAT IS TO BE MIGRATED FROM A  │
│     PHYSICAL ENVIRONMENT TO A CLOUD ENVIRONMENT         │
│                         1102                            │
└─────────────────────────────────────────────────────────┘
                            │
                            ▼
┌─────────────────────────────────────────────────────────┐
│ DETERMINE A MIGRATION ISSUE ASSOCIATED WITH THE         │
│ MIGRATION OF THE APPLICATION FROM THE PHYSICAL          │
│ ENVIRONMENT TO THE CLOUD ENVIRONMENT                    │
│                         1104                            │
└─────────────────────────────────────────────────────────┘
                            │
                            ▼
┌─────────────────────────────────────────────────────────┐
│ IDENTIFY, FROM A HISTORICAL ISSUE DATABASE, A PLURALITY │
│              OF HISTORICAL ISSUES                        │
│                         1106                            │
└─────────────────────────────────────────────────────────┘
                            │
                            ▼
┌─────────────────────────────────────────────────────────┐
│ COMPARE, THE MIGRATION ISSUE TO THE PLURALITY OF        │
│              HISTORICAL ISSUES                          │
│                         1108                            │
└─────────────────────────────────────────────────────────┘
                            │
                            ▼
┌─────────────────────────────────────────────────────────┐
│      SELECT, BASED ON THE COMPARISON, A RESOLUTION      │
│                         1110                            │
└─────────────────────────────────────────────────────────┘
                            │
                            ▼
┌─────────────────────────────────────────────────────────┐
│     EXECUTE THE RESOLUTION TO RESOLVE THE MIGRATION     │
│                         ISSUE                           │
│                         1112                            │
└─────────────────────────────────────────────────────────┘
                            │
                            ▼
┌─────────────────────────────────────────────────────────┐
│ PERFORM, BASED ON THE RESOLVED MIGRATION ISSUE,         │
│ MIGRATION OF THE APPLICATION FROM THE PHYSICAL          │
│ ENVIRONMENT TO THE CLOUD ENVIRONMENT                    │
│                         1114                            │
└─────────────────────────────────────────────────────────┘
```

*FIG. 11*

MIGRATION CONTEXT AND FLOW GRAPH BASED MIGRATION CONTROL

BACKGROUND

Cloud migration may include movement of data from a physical environment to a cloud environment. The data may include, for example, an application that is to be moved from the physical environment to the cloud environment. In such cases, various technical challenges can arise with respect to the movement of the data from the physical environment to the cloud environment.

BRIEF DESCRIPTION OF DRAWINGS

Features of the present disclosure are illustrated by way of example and not limited in the following figure(s), in which like numerals indicate like elements, in which:

FIG. 5 illustrates an example of historical resolutions to illustrate operation of the migration context and flow graph based migration control apparatus of FIG. 1, in accordance with an example of the present disclosure;

FIG. 6 illustrates an example of new issues to illustrate operation of the migration context and flow graph based migration control apparatus of FIG. 1, in accordance with an example of the present disclosure;

FIG. 7 illustrates examples of historical resolutions to illustrate operation of the migration context and flow graph based migration control apparatus of FIG. 1, in accordance with an example of the present disclosure;

FIG. 8 illustrates examples of new issues to illustrate operation of the migration context and flow graph based migration control apparatus of FIG. 1, in accordance with an example of the present disclosure;

FIG. 9 illustrates examples of unified proximity estimation to illustrate operation of the migration context and flow graph based migration control apparatus of FIG. 1, in accordance with an example of the present disclosure;

FIG. 11 illustrates a flowchart of an example method for migration context and flow graph based migration control in accordance with an example of the present disclosure.

DETAILED DESCRIPTION

Figure 1:
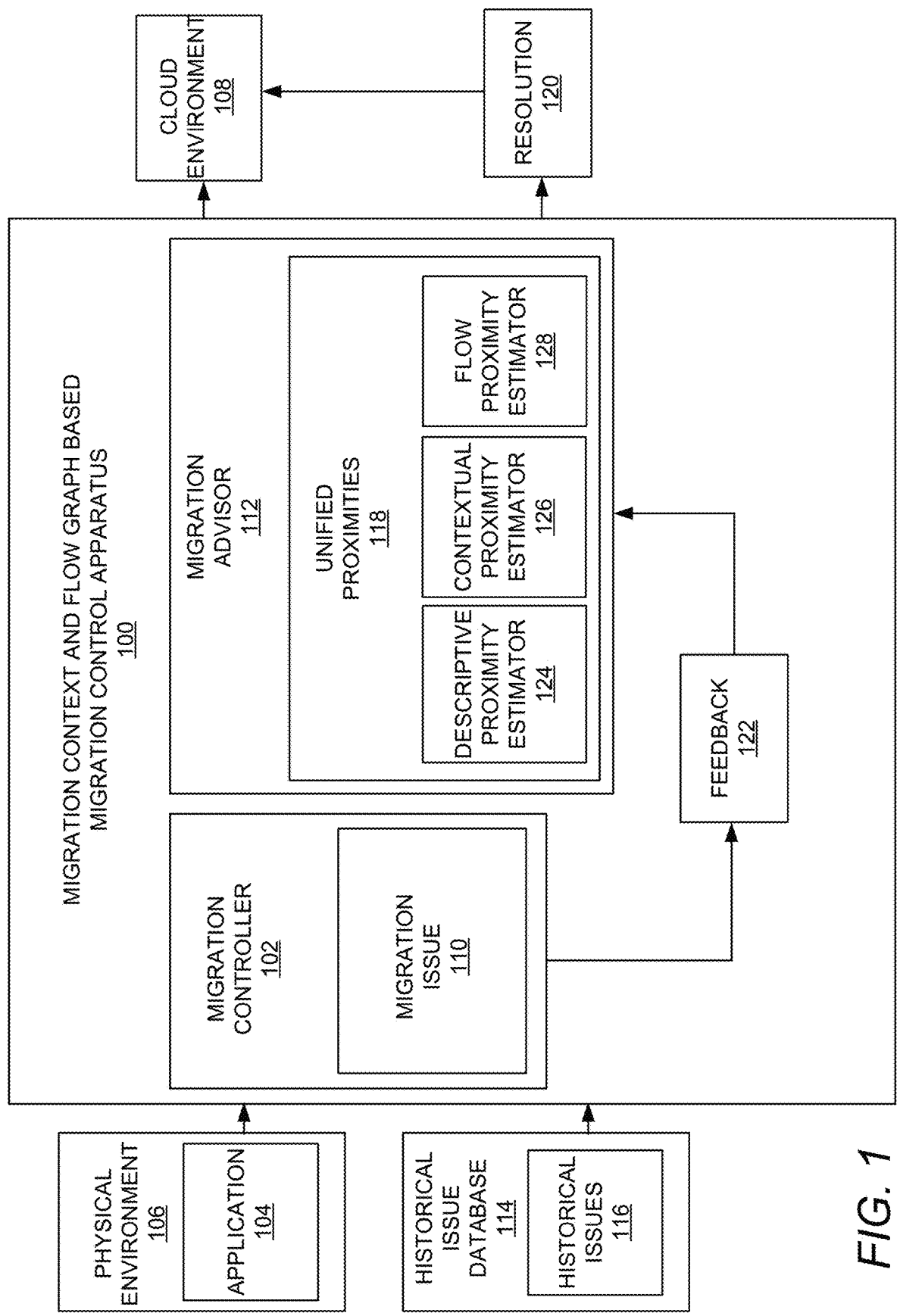
FIG. 1 illustrates a layout of a migration context and flow graph based migration control apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Migration context and flow graph based migration control apparatuses, methods for migration context and flow graph based migration control, and non-transitory computer readable media having stored thereon machine readable instructions to provide migration context and flow graph based migration control are disclosed herein. The apparatuses, methods, and non-transitory computer readable media disclosed herein provide for utilization of migration context and process flow information to identify accurate resolutions. In this regard, the apparatuses, methods, and non-transitory computer readable media disclosed herein provide for the precise estimation of semantic proximity between issues by utilizing a migration graph and a historical issue database. Higher accuracy is obtained by contextualizing a sub-process and utilizing the sub-process to determine which issue among all likely historical issues is more likely to be semantically closer to a currently raised issue under a current migration context. In this regard, the apparatuses, methods, and non-transitory computer readable media disclosed herein implement a computational agent (e.g., migration advisor as disclosed herein) to efficiently determine a semantically optimum resolution for a (cloud) migration issue. The computational agent may include the capabilities of modifying its computational processing of data and information by updating its parameters.

According to examples disclosed herein, the apparatuses, methods, and non-transitory computer readable media disclosed herein provide technical benefits such as reduction of computational resource utilization (e.g., processor time, network bandwidth, and energy) by making an overall migration process computationally efficient. For example, the apparatuses, methods, and non-transitory computer readable media disclosed herein minimize execution of those computational steps that do not contribute in an overall migration (e.g., minimizing redundant computations during issue resolution process).

According to examples disclosed herein, the apparatuses, methods, and non-transitory computer readable media disclosed herein resolve migration issues more efficiently by identifying correct resolutions at an early stage.

According to examples disclosed herein, absent to utilization of the apparatuses, methods, and non-transitory computer readable media disclosed herein, downstream migration processes may utilize higher levels of computational resources during issue resolution by identifying potentially incorrect resolutions during early stages, and in turn wasting computational resources in executing many potentially incorrect resolutions before arriving at a correct one.

According to examples disclosed herein, the apparatuses, methods, and non-transitory computer readable media disclosed herein may operate by interacting with downstream computational agents of a migration process. For example, the apparatuses, methods, and non-transitory computer readable media disclosed herein may estimate flow proximities among issues that cannot be performed by non-computational agents (e.g., human beings) since information is exchanged among the computational agents and not visible to external environments. In this regard, the migration process itself may represent a computational process that is executed by computational systems.

According to examples disclosed herein, with respect to the apparatuses, methods, and non-transitory computer readable media disclosed herein, the techniques disclosed herein may be utilized for a wide array of migration scenarios that include cloud migration (primary domain), migration of applications across different operating environments, migration of applications across different versions of backend software, and process migration (e.g., human resource system migration from one information system to another).

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example migration context and flow graph based migration control apparatus (hereinafter also referred to as "apparatus 100").

Referring to FIG. 1, the apparatus 100 may include a migration controller 102 that is executed by at least one hardware processor (e.g., the hardware processor 1002 of FIG. 10, and/or the hardware processor 1204 of FIG. 12) to ascertain an application 104 that is to be migrated from a physical environment 106 to a cloud environment 108 (or between two different environments, such as two different cloud environments). The migration controller 102 may determine a migration issue 110 associated with the migration of the application 104 from the physical environment 106 to the cloud environment 108.

A migration advisor 112 that is executed by at least one hardware processor (e.g., the hardware processor 1002 of FIG. 10, and/or the hardware processor 1204 of FIG. 12) may identify, from a historical issue database 114, a plurality of historical issues 116. The migration advisor 112 may determine, for the migration issue 110 and the plurality of historical issues 116, unified proximities 118. The migration advisor 112 may sort, based on the determined unified proximities 118, the historical issues 116. The migration advisor 112 may select, from the sorted historical issues, a topmost historical issue. The migration advisor 112 may determine, from the topmost historical issue, a resolution 120 associated with the topmost historical issue. The migration advisor 112 may forward the resolution 120 to the migration controller 102. The migration controller 102 may execute the resolution 120 to resolve the migration issue 110. Further, the migration controller 102 may perform, based on the resolved migration issue, migration of the application 104 from the physical environment 106 to the cloud environment 108.

According to examples disclosed herein, the migration advisor 112 may select, from the sorted historical issues, the topmost historical issue by selecting, from the sorted historical issues, the topmost historical issue that includes the resolution 120 that is executable.

According to examples disclosed herein, the migration controller 102 may execute the resolution 120 to resolve the migration issue 110, and perform, based on the resolved migration issue, migration of the application 104 from the physical environment 106 to the cloud environment 108 by determining, based on the execution of the resolution 120 to resolve the migration issue 110, whether the resolution 120 is valid. Further, the migration controller 102 may perform, based on a determination that the resolution 120 is valid and based on the resolved migration issue, migration of the application 104 from the physical environment 106 to the cloud environment 108.

According to examples disclosed herein, the migration controller 102 may receive, based on a determination that the resolution 120 is invalid, from the migration advisor 112, a further resolution corresponding to a next topmost historical issue. The migration controller 102 may execute the further resolution to resolve the migration issue 110. Further, the migration controller 102 may perform, based on the resolved migration issue, migration of the application 104 from the physical environment 106 to the cloud environment 108.

According to examples disclosed herein, the migration controller 102 may provide, based on a valid resolution to the migration issue 110, feedback 122 to the migration advisor 112 to associate the resolution 120 with the migration issue 110.

According to examples disclosed herein, the migration advisor 112 may determine, for the migration issue 110 and the plurality of historical issues 116, the unified proximities 118 by receiving, from a descriptive proximity estimator 124 that is executed by the at least one hardware processor (e.g., the hardware processor 1002 of FIG. 10, and/or the hardware processor 1204 of FIG. 12), descriptive proximities included in the unified proximities 118. The descriptive proximity may be based on issue description between two issues.

According to examples disclosed herein, the migration advisor 112 may determine, for the migration issue 110 and the plurality of historical issues 116, the unified proximities 118 by receiving, from a contextual proximity estimator 126 that is executed by the at least one hardware processor (e.g., the hardware processor 1002 of FIG. 10, and/or the hardware processor 1204 of FIG. 12), contextual proximities included in the unified proximities 118. The contextual proximity may be based on issue context between the two issues.

According to examples disclosed herein, the migration advisor 112 may determine, for the migration issue 110 and the plurality of historical issues 116, the unified proximities 118 by receiving, from a flow proximity estimator 128 that is executed by the at least one hardware processor (e.g., the hardware processor 1002 of FIG. 10, and/or the hardware processor 1204 of FIG. 12), flow proximities included in the unified proximities 118. The flow proximity may be based on a pairwise proximity between sub-processes of flows associated with the two issues.

Figure 2:
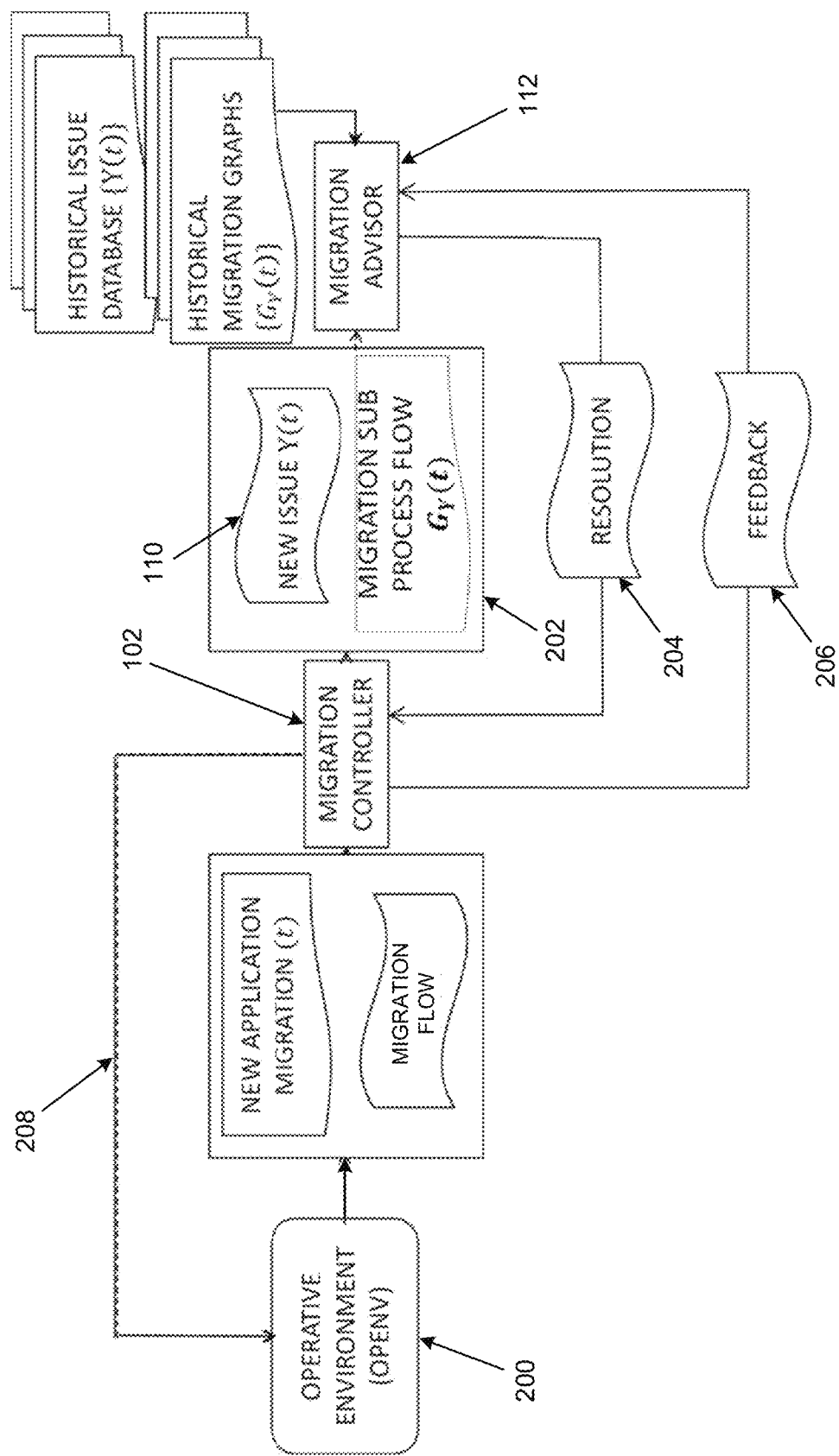
FIG. 2 illustrates a logical flow to illustrate operation of the migration context and flow graph based migration control apparatus of FIG. 1, in accordance with an example of the present disclosure.

FIG. 2 illustrates a logical flow to illustrate operation of the apparatus 100, in accordance with an example of the present disclosure.

Referring to FIG. 2, at 200, the migration controller 102 may be invoked for migration of a new application 104 to the cloud environment 108 (e.g., operative environment (OPENV)).

At 202, the migration controller 102 may encounter a migration issue 110.

At 204, the migration advisor 112 may generate a recommendation of a resolution 120 for the migration issue 110.

At 206, the migration controller 102 may generate feedback 122 on the resolution 120.

At 208, the migration controller 102 may complete migration of the application 104.

Figure 3:
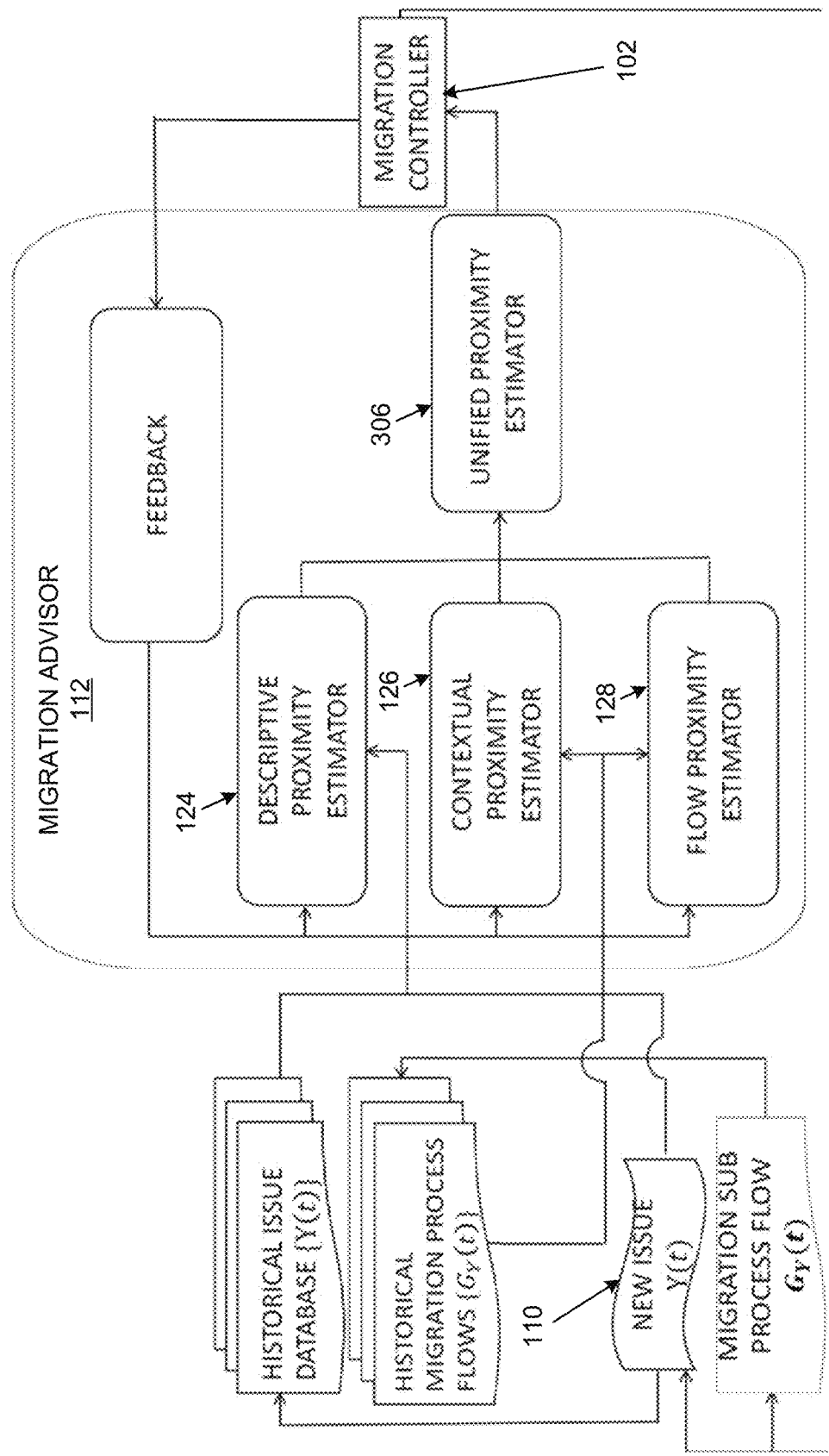
FIG. 3 illustrates a logical flow to illustrate operation of a migration advisor of the migration context and flow graph based migration control apparatus of FIG. 1, in accordance with an example of the present disclosure.

FIG. 3 illustrates a logical flow to illustrate operation of a migration advisor 112, in accordance with an example of the present disclosure.

Referring to FIGS. 1 and 3, the migration advisor 112 may include a descriptive proximity estimator 124 to determine descriptive proximity. With respect to estimating descriptive proximity, for issue details, an issue description may include the fields of description, impact level, and environment. Description (d), may include a text format, including natural language text describing issue occurred during migration. Impact level (i), may include an ordinal format, including estimates of criticality of the issue, and measured as high, medium, low, critical, severe, normal, etc. Environment (c), may include a categorical format, including environment in which the issue was raised (e.g., development environment, user acceptance testing, production environment, . . . , and may also be referred to as cutover).

With respect to descriptive proximity, issue description may be represented as follows:

$$issue_{id}=[d_{id}, i_{id}, c_{id}]$$

Descriptive proximity between two issues issue_a and issue_b may be determined as follows:

$$f_{dp}(issue_a, issue_b) = \alpha_d m(d_a, d_b) + \alpha_i m(i_a, i_b) + \alpha_c m(c_a, c_b)$$
Equation(1)

For Equation (1), $\alpha_d$, $\alpha_i$, and $\alpha_c \in [0,1]$ measure relative weights of different fields, and by default, $\alpha_d=3$; $\alpha_i=1$; $\alpha_c=0.1$.

For Equation (1), $m(d_a, d_b) = \cos(\vec{d_a}, \vec{d_b})$, where $\vec{d_a}$ and $\vec{d_b}$ are neural embeddings for descriptions of issues, and $\cos(\cdot,\cdot)$ is the cosine function. Further, $m(i_a, i_b) = rankDiff(i_a, i_b)$, where rankDiff( ) returns as number difference between ranks of arguments. For example, rankDiff(High, Medium)=1; rankDiff(High, Low)=2. Further, $m(c_a, c_b) = match(c_a, c_b)$, where:

$$match(x, y) = \begin{cases} 1 & \text{if } x \text{ and } y \text{ are equivalent} \\ 0 & \text{otherwise} \end{cases}$$

Next, the migration advisor 112 may include a contextual proximity estimator 126 to determine contextual proximity. With respect to estimating contextual proximity, for issue context, context of an issue raised for resolution advisory to the migration advisor 112 may include the following field that includes project context that includes business domain (bd) (e.g., string format) that describes the business segment to which the application caters to in the real world, such as finance, media, healthcare etc. Further, the project context may include technical domain (td) (e.g., string format) that describes the predominant technology of the application, such as web application, custom application, legacy application, etc.

Context of an issue raised for resolution advisory to the migration advisor 112 may further include the following field that includes migration context that includes migration strategy type (m) (e.g., categorical format) that refers to one of 'R's of migration such as re-host, re-platform, re-factor/re-architecture, re-purchase, source operating system (so) (e.g., categorical format) that refers to the operating system of source system to be migrated, such as Windows™, Linux™, etc., and target operating system (to) (e.g., categorical format) that refers to an operating system of a target such as Windows™, Linux™, etc. Migration context may further include source database (sd) (e.g., categorical format) that includes database engine of source system such as SQL™, Oracle™, SAP HANA™, IBM DB2™, etc., target database (td) (e.g., categorical format) that includes database engine of destination system such as SQL™, Oracle™, SAP HANA™, IBM DB2™, etc., and with upgrade (wu) (e.g., Boolean format) that includes whether it involves any database engine upgrade/change.

Context of an issue raised for resolution advisory to the migration advisor 112 may further include the following field that includes architectural context that includes number of servers (ns) (e.g., integer format) that include a count of source system identifications (IDs) to be migrated, volume of data (TB) (vd) (e.g., numeric format) that includes amount of database and flat files to be migrated in terabytes, and number of applications (na) (e.g., integer format) that includes a number of discrete applications in source system as grouped by business. Further, architectural context may further include source hardware (sh) (e.g., string format) that includes the physical hardware technology on which the source application runs, such as IBM Z Mainframe™, HP 3000™, Unisys ClearPath™, etc., CI/CD Pipeline (cc) (e.g., Boolean format) that includes whether any continuous integration or continuous delivery pipelines are deployed in source system that need to be migrated, cloud provider (cp) (e.g., string format) that includes target cloud provider such as AWS™, Azure™, GCP™, etc., and type of cloud (tc) (e.g., categorical format) that includes target cloud type such as public, private, hybrid, sovereign, etc.

Context of an issue raised for resolution advisory to the migration advisor 112 may further include the following field that includes sub-process/activity issue that is related to (sp) (e.g., string format).

A context for an issue may be characterized as follows:

$$Context(issue_{id})=[X_{pc}, X_{mc}, X_{ac}, sp_{id}], \text{ where:}$$

$$X_{pc}=(bd, td)_{id}$$

$$X_{mc}=\{m_{id}, (ss,ts)_{id}, (so,to)_{id}, (sd,td)_{id}, wu_{id}\}$$

$$X_{ac}=[ns_{id}, vd_{id}, na_{id}, sh_{id}, cc_{id}, cp_{id}, tc_{id}]$$

Contextual proximity between two issues may be determined by the contextual proximity estimator 126 as follows:

$$f_{cp}(issue_a, issue_b) = \alpha_{pc} mX_{pc} + \alpha_{mc} mX_{mc} + \alpha_{ac} mX_{ac} + \alpha_{mfc} mX_{mfc}, \text{ where}$$
$$mX_{pc} = m((bd, td)_a, (bd, td)_b)$$

-continued $$mX_{mc} = m(m_a, m_b) + m((ss, ts)_a, (ss, ts)_b) + m((so, to)_a, (so, to)_b) + m(wu_a, wu_b)$$
$$mX_{ac} = m(ns_a, ns_b) + m(vd_a, vd_b) + m(na_a, na_b) + m(sh_a, sh_b) + m(cc_a, cc_b) + m(cp_a, cp_b) + m(tc_a, tc_b)$$
$$mX_{mfc} = m(sp_a, sp_b)$$

$\alpha_{pc}, \alpha_{mc}, \alpha_{ac}$, and $\alpha_{mfc}$ measure relative weights of proximities of different context types By default, $\alpha_{mfc} > \alpha_{mc} > \alpha_{ac} > \alpha_{pc}$ $$m((bd, td)_a, (bd, td)_b) = mean(edit(bd_a, bd_b), edit(td_a, td_b))$$
$$m(m_a, m_b) = match(m_a, m_b)$$
$$m((so, to)_a, (so, to)_b) = mean(match(so_a, so_b), match(to_a, to_b))$$
$$m((sd, td)_a, (sd, td)_b) = mean(match(sd_a, sd_b), match(td_a, td_b))$$
$$m(wu_a, wu_b) = match(wu_a, wu_b)$$

//edit(string$_1$, string$_2$) is edit distance between input strings $$m(ns_a, ns_b) = |ns_a - ns_b|, m(vd_a, vd_b) = |vd_a - vd_b|$$
$$m(na_a, na_b) = |na_a - na_b|, m(sh, sh_b) = edit(sh_a, sh_b)$$
$$m(cc_a, cc_b) = match(cc_a, cc_b)$$
$$m(cp_a, cp_b) = edit(cp_a, cp_b)$$
$$m(tc_a, tc_b) = edit(tc_a, tc_b)$$
$$m(sp_a, sp_b) = edit(sp_a, sp_b)$$

//edit(string$_1$, string$_2$) is edit distance between input strings
// | |measures absolute difference An example of migration context driven advisory may include an issue that includes missing foreign keys and secondary indexes.

For the example of the migration context driven advisory, the context may include any objects that are not required are skipped to efficiently migrate the data from the source system. This may be discovered as an issue post migration on the destination system. Having the context of migration strategy employed may facilitate providing a more accurate resolution in such a scenario.

For the example of the migration context driven advisory, with respect to rehosting, there may be no change in database engine. Data format may remain the same. Hence, the resolution may be to use the native tools of the database for creating missing objects.

For the example of the migration context driven advisory, refactoring may generally involve migrating to a different database engine. In such a scenario, the resolution may include using a schema conversion tool for migrating the objects.

Figure 4:
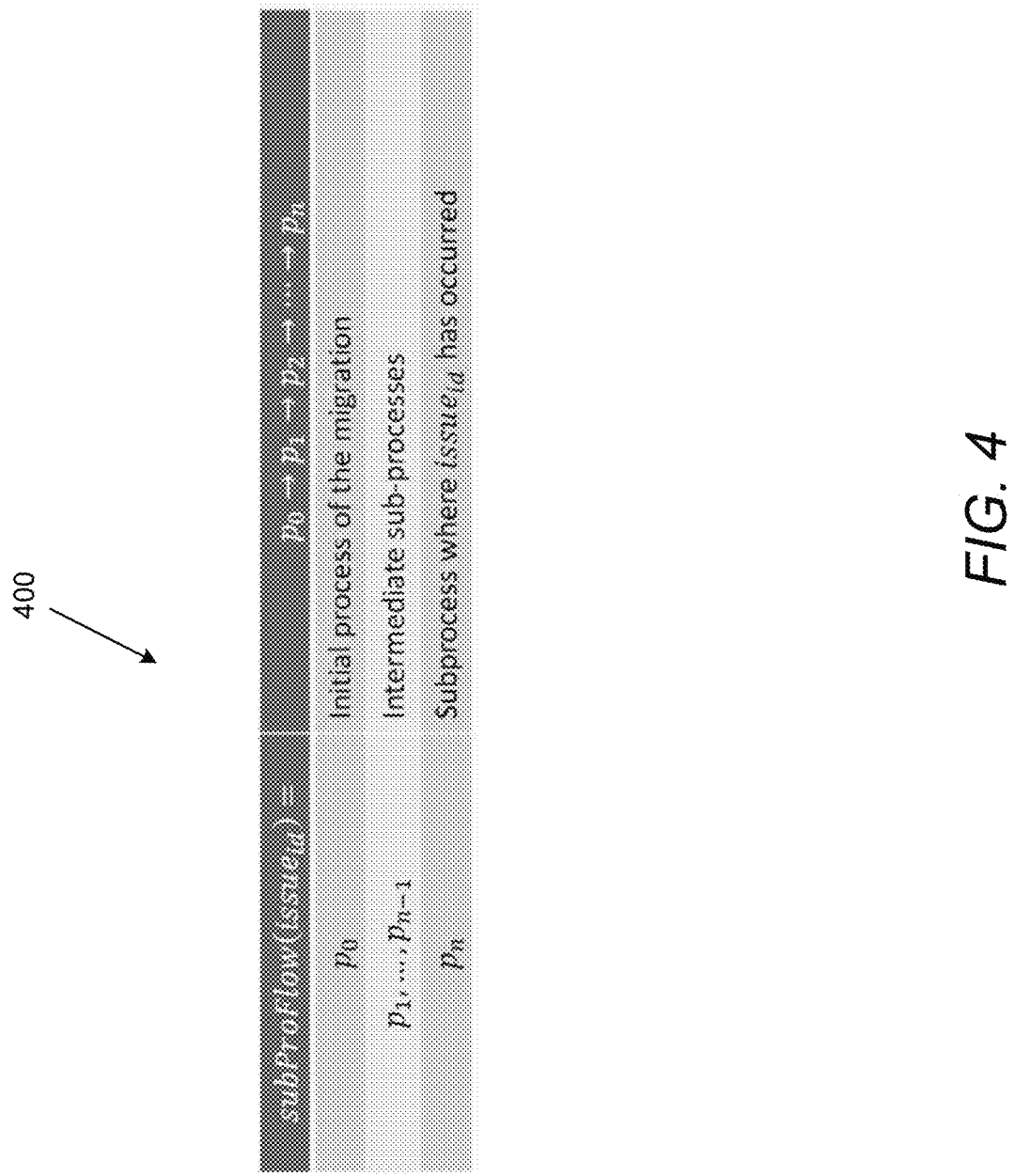
FIG. 4 illustrates a sequence of processes to illustrate operation of the migration context and flow graph based migration control apparatus of FIG. 1, in accordance with an example of the present disclosure.

FIG. 4 illustrates a sequence of processes to illustrate operation of the apparatus 100, in accordance with an example of the present disclosure.

Referring to FIGS. 1, 3, and 4, the migration advisor 112 may include a flow proximity estimator 128 to determine flow proximity. With respect to flow proximity, as shown in FIG. 4 at 400, for sub process flow, starting with the migration's initiation process, the migration controller 102 (or operating environment) may record process flow until the sub-process in which an issue has occurred. This process flow may be formulated as a sequence of processes (with optional details). In cases when sub-process flow details for an issue are not known, the sub-process may be associated with initial process $p_0$.

With respect to process proximity, the flow proximity estimator 128 may specify sub-process flows associated with two issues to be:

$$subProFlow(issue_a) = p_0 \to p_1 \to p_2 \to \ldots \to p_n$$

$$subProFlow(issue_a) = q_0 \to q_1 \to q_2 \to \ldots \to q_n$$

For each pair of sub-processes in these flows, their pairwise proximity may be determined as follows:

$$processProximity(p_i, q_j) \quad \text{Equation (2)}$$

Equation (2) represents proximity between sub-process $p_i$ and $q_j$ for all ($i \in 1 \ldots n$; $j \in 0 \ldots m$).

Function processProximity($p_i, q_j$) may be defined by the design environment, for example as:

$$\text{process Proximity}(p_i, q_j) = \begin{cases} 1 & \text{if } p_i = q_j \text{ (as per domain ontology)} \\ 0 & \text{otherwise} \end{cases}$$

Next, with respect to flow proximity determination by the flow proximity estimator 128, with respect to pairwise process proximities, flow proximity $f_{fp}$ between these issues may be determined as follows:

$$seqSim(Z_a, Z_b) = \begin{cases} 0 & \text{if } n = 0 \text{ OR } m = 0 \\ seqSim(\text{tail }(Z_a), \text{tail }(Z_b)) & \text{if } Z_a[0] = Z\_b[0] \\ 1 + seqSim(\text{tail}^2(Z_a), \text{tail}^2(Z_b)) & \text{if } C_{tr} \\ 1 + \lambda & \text{otherwise} \end{cases}$$

$$\lambda = \min \begin{cases} seqSim(\text{tail }(Z_a), (Z_b)) \\ seqSim(Z_a, \text{tail }(Z_b)) \\ seqSim(\text{tail }(Z_a), \text{tail }(Z_b)) \end{cases}$$

$Z_a$ = (sub Pro Flow(issue$_a$))

$Z_b$ = (sub Pro Flow(issue$_b$))

tail $(p_r \to P_{r+1} \to \ldots) = p_{r+1} \to \ldots$ tail$^2$ $(Z)$ = tail (tail $(Z)$)

Referring to FIGS. 1 and 3, the migration advisor 112 may include a unified proximity estimator 306 to determine unified proximity. With respect to unified proximity, for an issue resolution driven feedback loop, unified proximity may be determined as a function of descriptive proximity measured by $f_{dp}(\bullet,\bullet)$, contextual proximity measured by $f_{cp}(\bullet,\bullet)$, and flow proximity measured by $f_{fp}(\bullet,\bullet)$. Unified proximity between two issues may be determined as $f_{up}(\bullet,\bullet)$ as follows:

$$f_{up}(issue_a, issue_b) = w_{dp}f_{dp}(issue_a, issue_b) + w_{cp}f_{cp}(issue_a, issue_b) + w_{fp}f_{dp}(issue_a, issue_b) \quad \text{Equation (3)}$$

For Equation (3), $w_{dp}, w_{cp}, w_{fp} \in [0, \ldots]$ may represent weights, which correspond to relative significances of different proximities between issues. By default, $w_{fp}=1$, $w_{dp}=2$, $w_{cp}$=4. With availability of statistically significant data, these weights may be learnt by applying regression techniques.

Next, with respect to issue advisory, the migration advisor 112 may specify historical database of issues to be:

$$\Delta_{hist}(t)=\{i_1, i_2, \ldots i_k\}$$

In this regard, each issue $i_j$ may include one or more of the details presented before (description, context, sub-process flow), and t may represent a current time point.

For a new issue $i_{new}$, the migration advisor 112 may determine unified proximities of the new issue with all historical issues in $\Delta_{hist}(t)$ as follows:

$$f_{up}(i_{new}, i_1), \ldots, f_{up}(i_{new}, i_k)$$

Next, the migration advisor 112 may sort historical issues in order of their unified proximities with new issue $i_{new}$ in a non-increasing order. In this regard, if elements are ordered in this manner, then when the elements are traced as per the order, their values do not increase (e.g., 1.2, 1.1, 1.1, 0.9 is a non-increasing order).

Next, the migration advisor 112 may select the topmost issue having executable resolution steps (sequence of instructions/APIs/programs), and transfer these resolution steps to the migration controller 102. In this regard, the migration controller 102 may set flag variable RESOLVED=FALSE. Further, the migration controller 102 may remove all issues from the sorted list until the currently selected issue.

Next, the migration controller 102 may execute these resolution steps towards resolving the current issue, and signals to the operating environment for executing an issue resolution validation procedure.

With respect to feedback driven proximity updates, the migration controller 102 may set flag variable RESOLVED=TRUE when the validation procedure succeeds (e.g., resolution steps on their execution correctly resolve the issue and the migration controller 102 proceeds to execute next sub-process/task). Further, the migration controller 102 may terminate the process of communication with migration advisor 112, and continues with next sub-process/task in the migration path.

Otherwise, if the resolution process fails to resolve the issue (e.g., error recurs during validation process), the migration controller 102 may set flag variable RESOLVED=FALSE. The migration controller 102 may signal to the migration advisor 112 to execute selection of next available resolution (e.g., as discussed above, the migration advisor 112 may select the topmost issue having executable resolution steps (sequence of instructions/APIs/programs), and transfer these resolution steps to the migration controller 102).

The aforementioned steps related to setting of flag variable RESOLVED=TRUE, and flag variable RESOLVED=FALSE may be repeated until either the validation procedure succeeds or there are no more resolutions to execute as per the historical database.

Next, at the conclusion of the step related to setting of flag variable RESOLVED=TRUE, the migration advisor 112 may identify the historical issue for feedback driven proximity updating. As a first case (Case 1), migration advisor 112 may specify $i_l \in \Delta_{hist}(t)$ to be issue, resolution of which is accepted by the operating environment, and set $i_{rel}=i_l$. For a second case (Case 2), this case may represent that the migration advisor 112 did not consider any of the historical issues as relevant for resolving current issue (i.e., validation procedure failed for all resolutions). In this regard, the migration advisor 112 may set $i_{rel}=i_x$ such that unified proximity of $i_x$ with $i_{new}$ is the least among all historical issues.

Next, the migration advisor 112 may generate three lists of historical issues. The first list may include case [description based], where $\Delta_{hist}^d(t)$ may be specified to be the list of historical issues sorted in decreasing order as per their descriptive proximities $f_{dp}(i_{new}, \bullet)$ with new issue $i_{new}$. The second list may include case [context based], where $\Delta_{hist}^c(t)$ may be specified to be list of historical issues sorted in decreasing order as per their contextual proximities $f_{cp}(i_{new}, \bullet)$ with new issue $i_{new}$. Finally, the third list may be case [sub-process flow based], where $\Delta_{hist}^f(t)$ may be specified be the list of historical issues sorted in decreasing order as per their flow proximities $f_{fp}(i_{new}, \bullet)$ with new issue $i_{new}$.

Next, the migration advisor 112 may identify the ranks of $i_{rel}$ in all of these three lists. In this regard, the migration advisor 112 may specify $rank_d(i_{rel})$, $rank_c(i_{rel})$, and $rank_f(i_{rel})$ to be ranks of $i_{rel}$ in the lists $\Delta_{hist}^d$, $\Delta_{hist}^c$, and $\Delta_{hist}^f$, respectively. Further, the migration advisor 112 may order $rank_d(i_{rel})$, $rank_c(i_{rel})$, and $rank_f(i_{rel})$ in decreasing order.

Lastly, the migration advisor 112 may minimally update weights for different proximities (e.g., $w_{dp}$, $w_{cp}$, $w_{fp}$) so that using updated weights, proximities of historical issues with new issue $i_{new}$ render rank of issue $i_{rel}$ in the same order as above.

FIG. 5 illustrates an example of historical resolutions (e.g., associated with the historical issues 116) to illustrate operation of the apparatus 100, in accordance with an example of the present disclosure.

Referring to FIG. 5, for example, issue ID 1 may represent an intermittent connectivity issue, including a resolution to "restart application to pickup new resource adapter name".

FIG. 6 illustrates an example of new issues to illustrate operation of the apparatus 100, in accordance with an example of the present disclosure.

Referring to FIG. 6, for example, issue ID X (e.g., migration issue 110) may represent a database intermittent connector errors, including a resolution that matches issue 3 of FIG. 5.

FIG. 7 illustrates examples of historical resolutions to illustrate operation of the apparatus 100, in accordance with an example of the present disclosure.

Referring to FIG. 7, details of resolutions 1-5 associated with issues 1-5 are shown.

FIG. 8 illustrates examples of new issues to illustrate operation of the apparatus 100, in accordance with an example of the present disclosure.

Referring to FIG. 8, details of new issues X and Y of FIG. 5 are shown.

Figure 9:
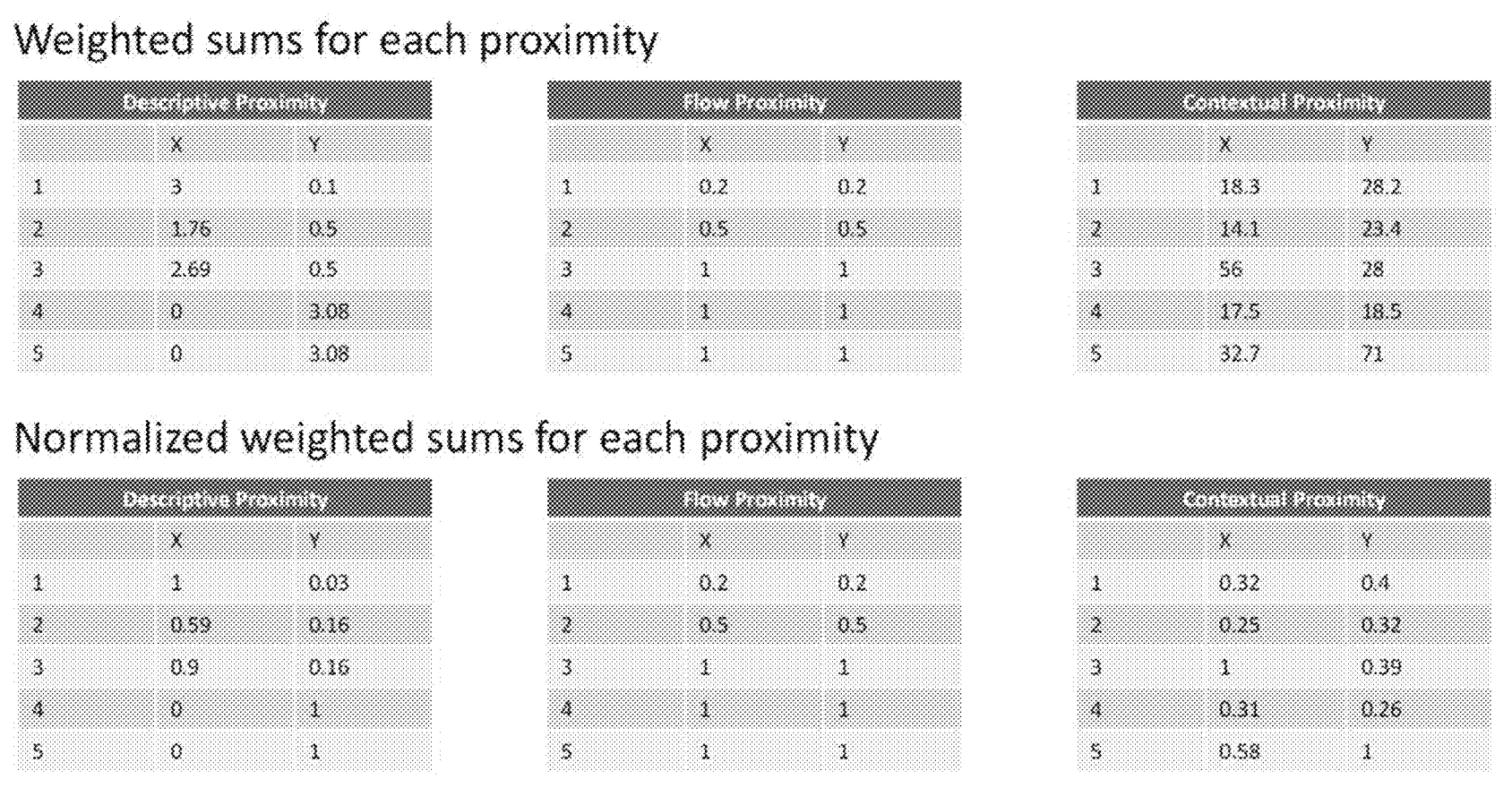

FIG. 9 illustrates examples of unified proximity estimation to illustrate operation of the apparatus 100, in accordance with an example of the present disclosure.

Referring to FIG. 9, for X, even though resolution #1 (1) had a higher descriptive proximity, the unified proximity score brings out resolution #3 (0.9) as a better match due to its similarity in migration context and sub-process where the issue has occurred. Further, for Y, resolution #4 and #5 are equal matches based on descriptive proximity. However, due to the different migration strategies and relevant parameters, issue #5 is shown as a better match. With regard to the values 6.8 and 7, the significance of these values may be ascertained when considered in comparison with other unified scores in the same issue context (e.g., when unified proximity score 6.8 for historical issue #3 (in context of issue X) is compared with unified proximity scores for other historical issues). In this example, 6.8 is the maximum score, which means, among all existing historical issues (numbered 1 to 5), issue #3 has a maximum overall significance for new issue X. Similar is the case of unified proximity score 7 for historical issue #5 in context of issue Y.

Figure 10:
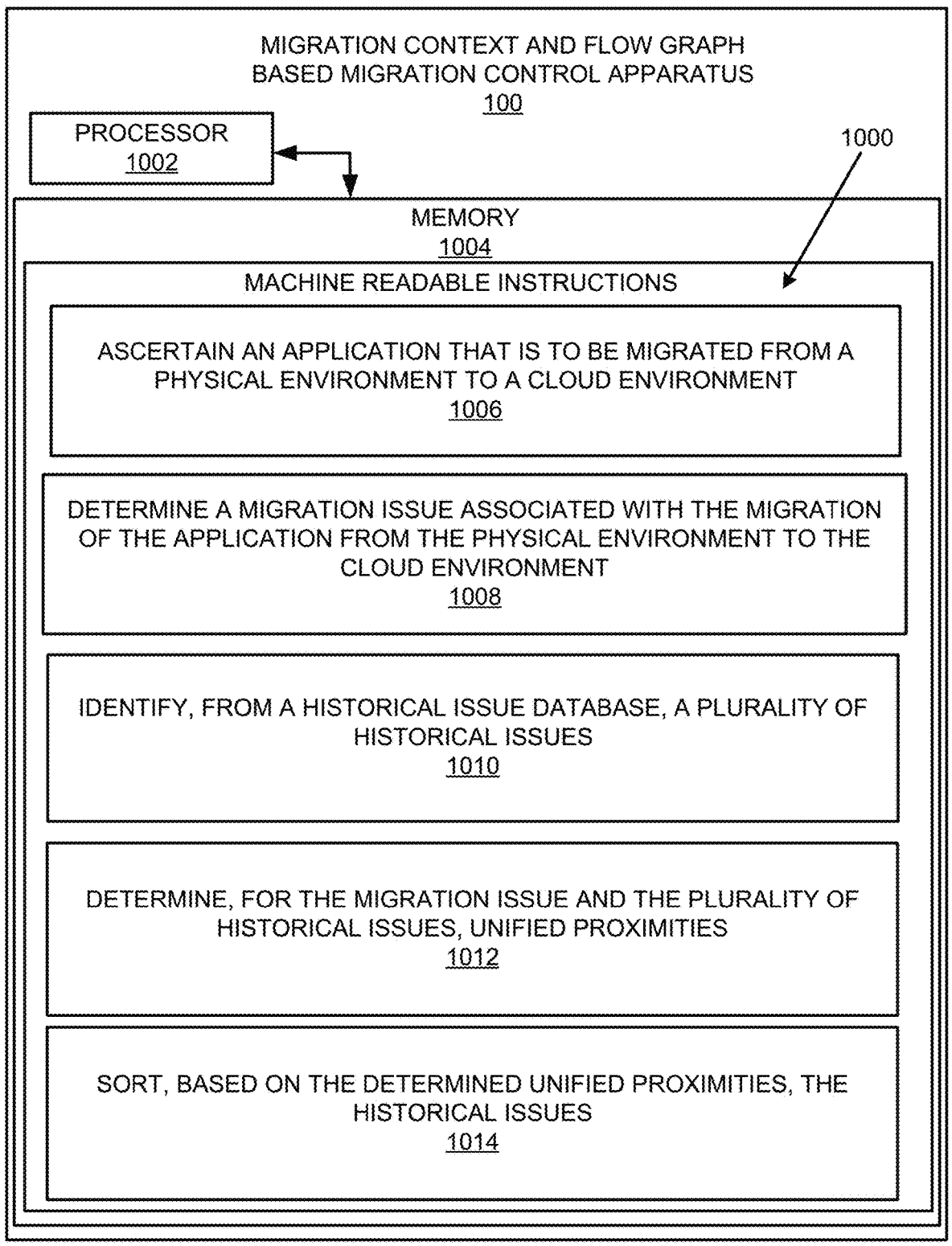
FIG. 10 illustrates an example block diagram for migration context and flow graph based migration control in accordance with an example of the present disclosure.
Figure 10:
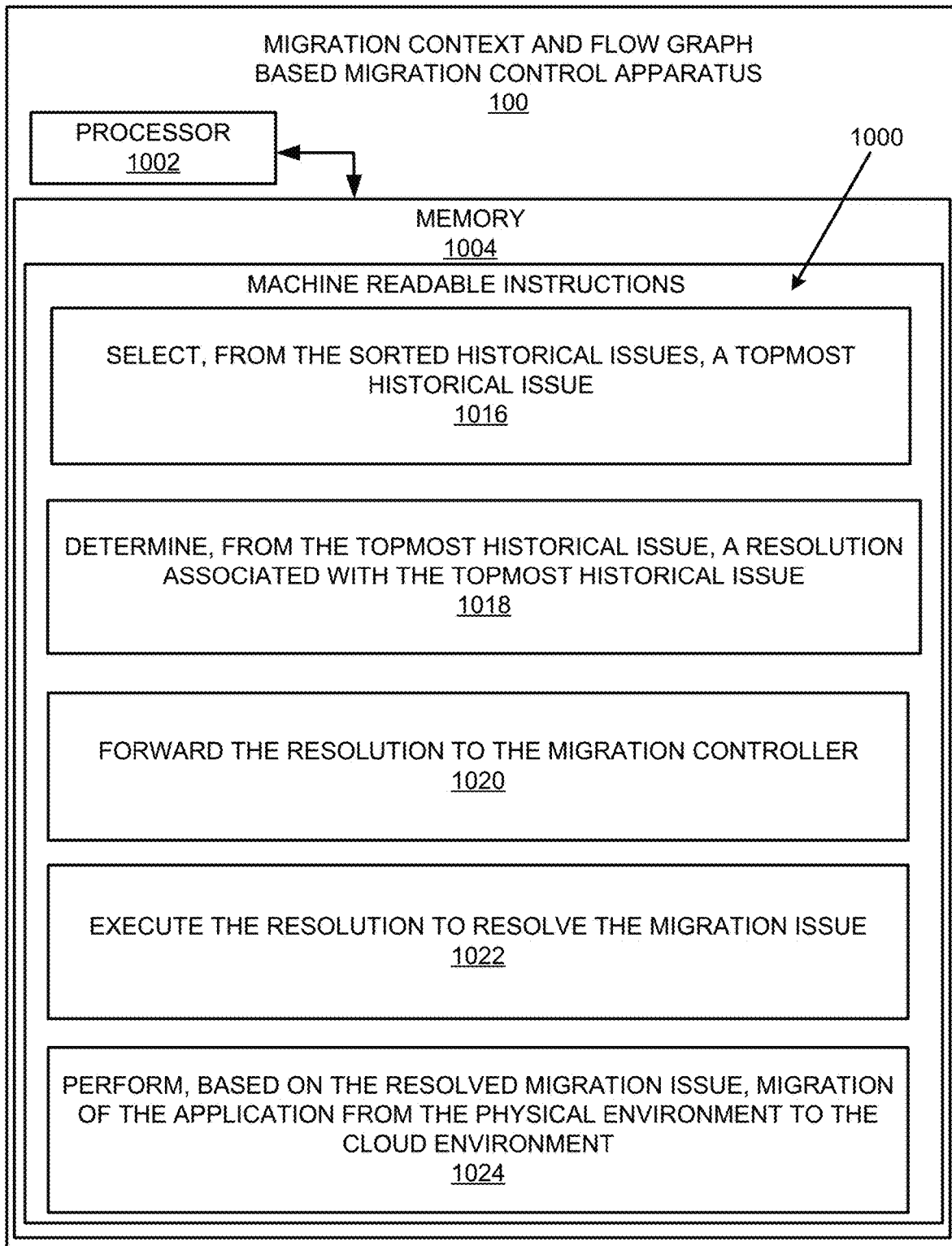
Figure 12:
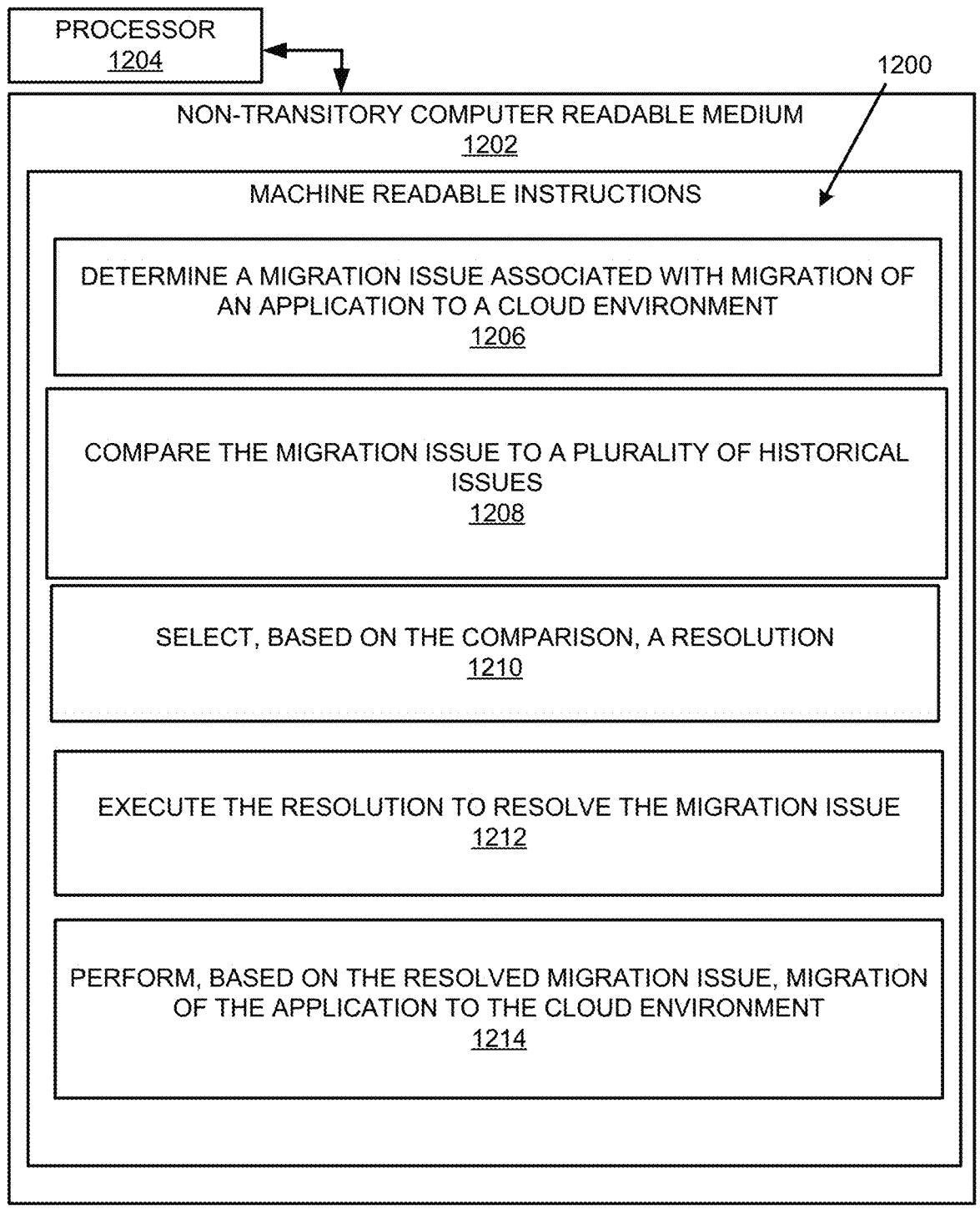
FIG. 12 illustrates a further example block diagram for migration context and flow graph based migration control in accordance with another example of the present disclosure.

FIGS. 10-12 respectively illustrate an example block diagram 1000, a flowchart of an example method 1100, and a further example block diagram 1200 for migration context and flow graph based migration control, according to examples. The block diagram 1000, the method 1100, and the block diagram 1200 may be implemented on the apparatus 100 described above with reference to FIG. 1 by way of example and not of limitation. The block diagram 1000, the method 1100, and the block diagram 1200 may be practiced in other apparatus. In addition to showing the block diagram 1000, FIG. 10 shows hardware of the apparatus 100 that may execute the instructions of the block diagram 1000. The hardware may include a processor 1002, and a memory 1004 storing machine readable instructions that when executed by the processor cause the processor to perform the instructions of the block diagram 1000. The memory 1004 may represent a non-transitory computer readable medium. FIG. 11 may represent an example method for migration context and flow graph based migration control, and the steps of the method. FIG. 12 may represent a non-transitory computer readable medium 1202 having stored thereon machine readable instructions to provide migration context and flow graph based migration control according to an example. The machine readable instructions, when executed, cause a processor 1204 to perform the instructions of the block diagram 1200 also shown in FIG. 12.

The processor 1002 of FIG. 10 and/or the processor 1204 of FIG. 12 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1202 of FIG. 12), such as hardware storage devices (e.g., RAM (random access memory), ROM (read only memory), EPROM (erasable, programmable ROM), EEPROM (electrically erasable, programmable ROM), hard drives, and flash memory). The memory 1004 may include a RAM, where the machine readable instructions and data for a processor may reside during runtime.

Referring to FIGS. 1-10, and particularly to the block diagram 1000 shown in FIG. 10, the memory 1004 may include instructions 1006 to ascertain an application 104 that is to be migrated from a physical environment 106 to a cloud environment 108.

The processor 1002 may fetch, decode, and execute the instructions 1008 to determine a migration issue 110 associated with the migration of the application 104 from the physical environment 106 to the cloud environment 108.

The processor 1002 may fetch, decode, and execute the instructions 1010 to identify, from a historical issue database 114, a plurality of historical issues 116.

The processor 1002 may fetch, decode, and execute the instructions 1012 to determine, for the migration issue 110 and the plurality of historical issues 116, unified proximities 118.

The processor 1002 may fetch, decode, and execute the instructions 1014 to sort, based on the determined unified proximities 118, the historical issues 116.

The processor 1002 may fetch, decode, and execute the instructions 1016 to select, from the sorted historical issues, a topmost historical issue.

The processor 1002 may fetch, decode, and execute the instructions 1018 to determine, from the topmost historical issue, a resolution 120 associated with the topmost historical issue.

The processor 1002 may fetch, decode, and execute the instructions 1020 to forward the resolution 120 to the migration controller 102.

The processor 1002 may fetch, decode, and execute the instructions 1022 to execute the resolution 120 to resolve the migration issue 110.

The processor 1002 may fetch, decode, and execute the instructions 1024 to perform, based on the resolved migration issue, migration of the application 104 from the physical environment 106 to the cloud environment 108.

Referring to FIGS. 1-9 and 11, and particularly FIG. 11, for the method 1100, at block 1102, the method may include ascertaining an application 104 that is to be migrated from a physical environment 106 to a cloud environment 108.

At block 1104, the method may include determining a migration issue 110 associated with the migration of the application 104 from the physical environment 106 to the cloud environment 108.

At block 1106, the method may include identifying from a historical issue database 114, a plurality of historical issues 116.

At block 1108, the method may include comparing the migration issue 110 to the plurality of historical issues 116.

At block 1110, the method may include selecting, based on the comparison, a resolution 120.

At block 1112, the method may include executing the resolution 120 to resolve the migration issue 110.

At block 1114, the method may include performing, based on the resolved migration issue, migration of the application 104 from the physical environment 106 to the cloud environment 108.

Referring to FIGS. 1-9 and 12, and particularly FIG. 12, for the block diagram 1200, the non-transitory computer readable medium 1202 may include instructions 1206 to determine a migration issue 110 associated with migration of an application 104 to a cloud environment 108.

The processor 1204 may fetch, decode, and execute the instructions 1208 to compare the migration issue 110 to a plurality of historical issues 116.

The processor 1204 may fetch, decode, and execute the instructions 1210 to select, based on the comparison, a resolution 120.

The processor 1204 may fetch, decode, and execute the instructions 1212 to execute the resolution 120 to resolve the migration issue 110.

The processor 1204 may fetch, decode, and execute the instructions 1214 to perform, based on the resolved migration issue, migration of the application 104 to the cloud environment 108.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A migration context and flow graph based migration control apparatus comprising:
    a migration controller, executed by at least one hardware processor, to
        ascertain an application that is to be migrated from a physical environment to a cloud environment, and
        determine a migration issue associated with the migration of the application from the physical environment to the cloud environment; and
    a migration advisor, executed by the at least one hardware processor, to
        identify, from a historical issue database, a plurality of historical issues,
        determine, for the migration issue and the plurality of historical issues, unified proximities,
        sort, based on the determined unified proximities, the historical issues,
        select, from the sorted historical issues, a topmost historical issue,
        determine, from the topmost historical issue, a resolution associated with the topmost historical issue, and
        forward the resolution to the migration controller,
    wherein the migration controller is further executed by the at least one hardware processor to
        execute the resolution to resolve the migration issue, and
        perform, based on the resolved migration issue, migration of the application from the physical environment to the cloud environment.

2. The migration context and flow graph based migration control apparatus according to claim 1, wherein the migration advisor is executed by the at least one hardware processor to select, from the sorted historical issues, the topmost historical issue by:
    selecting, from the sorted historical issues, the topmost historical issue that includes the resolution that is executable.

3. The migration context and flow graph based migration control apparatus according to claim 1, wherein the migration controller is executed by the at least one hardware processor to execute the resolution to resolve the migration issue, and perform, based on the resolved migration issue, migration of the application from the physical environment to the cloud environment by:
    determining, based on the execution of the resolution to resolve the migration issue, whether the resolution is valid; and
    performing, based on a determination that the resolution is valid and based on the resolved migration issue, migration of the application from the physical environment to the cloud environment.

4. The migration context and flow graph based migration control apparatus according to claim 3, wherein the migration controller is executed by the at least one hardware processor to:
    receive, based on a determination that the resolution is invalid, from the migration advisor, a further resolution corresponding to a next topmost historical issue;
    execute the further resolution to resolve the migration issue; and
    perform, based on the resolved migration issue, migration of the application from the physical environment to the cloud environment.

5. The migration context and flow graph based migration control apparatus according to claim 3, wherein the migration controller is executed by the at least one hardware processor to:
    provide, based on a valid resolution to the migration issue, feedback to the migration advisor to associate the resolution with the migration issue.

6. The migration context and flow graph based migration control apparatus according to claim 1, wherein the migration advisor is executed by the at least one hardware processor to determine, for the migration issue and the plurality of historical issues, the unified proximities by:
    receiving, from a descriptive proximity estimator that is executed by the at least one hardware processor, descriptive proximities included in the unified proximities, wherein a descriptive proximity is based on issue description between two issues.

7. The migration context and flow graph based migration control apparatus according to claim 6, wherein the migration advisor is executed by the at least one hardware processor to determine, for the migration issue and the plurality of historical issues, the unified proximities by:
    receiving, from a contextual proximity estimator that is executed by the at least one hardware processor, contextual proximities included in the unified proximities, wherein a contextual proximity is based on issue context between the two issues.

8. The migration context and flow graph based migration control apparatus according to claim 7, wherein the migration advisor is executed by the at least one hardware processor to determine, for the migration issue and the plurality of historical issues, the unified proximities by:
    receiving, from a flow proximity estimator that is executed by the at least one hardware processor, flow proximities included in the unified proximities, wherein a flow proximity is based on a pairwise proximity between sub-processes of flows associated with the two issues.

9. A method for migration context and flow graph based migration control, the method comprising:
    ascertaining, by at least one hardware processor, an application that is to be migrated from a physical environment to a cloud environment;
    determining, by the at least one hardware processor, a migration issue associated with the migration of the application from the physical environment to the cloud environment;
    identifying, by the at least one hardware processor, from a historical issue database, a plurality of historical issues;
    comparing, by the at least one hardware processor, the migration issue to the plurality of historical issues;
    selecting, by the at least one hardware processor and based on the comparison, a resolution;
    executing, by the at least one hardware processor, the resolution to resolve the migration issue;
    determining, by the at least one hardware processor, based on the execution of the resolution to resolve the migration issue, whether the resolution is valid;
    receiving, by the at least one hardware processor, based on a determination that the resolution is invalid, a further resolution corresponding to a specified historical issue of the plurality of historical issues;
    executing, by the at least one hardware processor, the further resolution to resolve the migration issue; and performing, by the at least one hardware processor, based on the resolved migration issue, migration of the application from the physical environment to the cloud environment.

10. The method according to claim 9, wherein comparing, by the at least one hardware processor, the migration issue to the plurality of historical issues, and selecting, by the at least one hardware processor and based on the comparison, the resolution further comprises:
determining, by the at least one hardware processor, for the migration issue and the plurality of historical issues, unified proximities;
sorting, by the at least one hardware processor, based on the determined unified proximities, the historical issues;
selecting, by the at least one hardware processor, from the sorted historical issues, a topmost historical issue; and
determining, by the at least one hardware processor, from the topmost historical issue, the resolution associated with the topmost historical issue.

11. The method according to claim 10, wherein selecting, by the at least one hardware processor, from the sorted historical issues, the topmost historical issue further comprises:
selecting, from the sorted historical issues, the topmost historical issue that includes the resolution that is executable.

12. The method according to claim 9, wherein executing, by the at least one hardware processor, the resolution to resolve the migration issue, and performing, by the at least one hardware processor, based on the resolved migration issue, migration of the application from the physical environment to the cloud environment further comprises:
performing, by the at least one hardware processor, based on a determination that the resolution is valid and based on the resolved migration issue, migration of the application from the physical environment to the cloud environment.

13. The method according to claim 12, further comprising:
receiving, by the at least one hardware processor, based on the determination that the resolution is invalid, the further resolution corresponding to a next topmost historical issue;
executing, by the at least one hardware processor, the further resolution to resolve the migration issue; and
performing, by the at least one hardware processor and based on the resolved migration issue, migration of the application from the physical environment to the cloud environment.

14. The method according to claim 12, further comprising:
providing, by the at least one hardware processor, based on a valid resolution to the migration issue, feedback to associate the resolution with the migration issue.

15. The method according to claim 10, wherein determining, by the at least one hardware processor, for the migration issue and the plurality of historical issues, the unified proximities, further comprises:
receiving, by the at least one hardware processor, descriptive proximities included in the unified proximities, wherein a descriptive proximity is based on issue description between two issues.

16. The method according to claim 15, wherein determining, by the at least one hardware processor, for the migration issue and the plurality of historical issues, the unified proximities, further comprises:
receiving, by the at least one hardware processor, contextual proximities included in the unified proximities, wherein a contextual proximity is based on issue context between the two issues.

17. The method according to claim 16, wherein determining, by the at least one hardware processor, for the migration issue and the plurality of historical issues, the unified proximities, further comprises:
receiving, by the at least one hardware processor, flow proximities included in the unified proximities, wherein a flow proximity is based on a pairwise proximity between sub-processes of flows associated with the two issues.

18. A non-transitory computer readable medium having stored thereon machine readable instructions, the machine readable instructions, when executed by at least one hardware processor, cause the at least one hardware processor to:
determine a migration issue associated with migration of an application to a cloud environment;
compare the migration issue to a plurality of historical issues by:
determining, for the migration issue and the plurality of historical issues, unified proximities;
sorting, based on the determined unified proximities, the historical issues; and
selecting, from the sorted historical issues, a topmost historical issue;
select, based on the comparison, a resolution by determining, from the topmost historical issue, the resolution associated with the topmost historical issue;
execute the resolution to resolve the migration issue; and
perform, based on the resolved migration issue, migration of the application to the cloud environment.

19. The non-transitory computer readable medium according to claim 18, wherein the machine readable instructions to execute the resolution to resolve the migration issue, and perform, based on the resolved migration issue, migration of the application to the cloud environment, further cause the at least one hardware processor to:
determine, based on the execution of the resolution to resolve the migration issue, whether the resolution is valid; and
perform, based on a determination that the resolution is valid and based on the resolved migration issue, migration of the application to the cloud environment.

\* \* \* \* \*